May 16, 1961  E. D. WILGUS  2,983,978

CONNECTING DEVICES

Filed Oct. 31, 1957

Inventor
Edward D. Wilgus
By Ralph B. Stewart
attorney

United States Patent Office 2,983,978
Patented May 16, 1961

2,983,978
CONNECTING DEVICES

Edward D. Wilgus, Glendale, Calif., assignor to Aerpat Aktien Gesellschaft, Glarus, Switzerland, a corporation of Switzerland Filed Oct. 31, 1957, Ser. No. 693,729

5 Claims. (Cl. 24—211)

This invention relates to connecting devices of the kind commonly used for connecting sheets or other articles having registering apertures comprising a tubular member, an axially movable member therein, at least one radially movable member in the passage in the wall of said tubular member from which said radially movable member cannot escape outwardly but through which a portion of said radially movable member projects beyond the external surface of said tubular member when said axially movable member is in its normal position, and means permitting said radially movable member to move inwards to a position at least flush with the external surface of the tubular member on displacement of the axially movable member.

Double acting connecting devices of this type are already known in which the radially movable member(s) is allowed to move inwards upon movement of the axially movable member in either direction.

According to my invention the axially movable member when in its normal position co-operates at or near one end thereof with the radially movable member(s) to hold it outwardly and is displaceable at least in one direction to bring said end thereof clear of said member(s) to allow it to move inwardly, and spring means are provided to prevent the radially movable member(s) from moving inwardly except when urged in that direction.

The axially movable member may be recessed or reduced near the part where it co-operates with the radially movable member(s) to hold it outwardly so that the radially movable member(s) may move inwardly when the axially movable member is displaced in either direction.

In order that the invention may be clearly understood and readily carried into effect an embodiment thereof is by way of example more fully described hereinafter with reference to the accompanying drawing, which is given for purposes of illustration only and not of limitation.

In the drawing—

Figure 1:
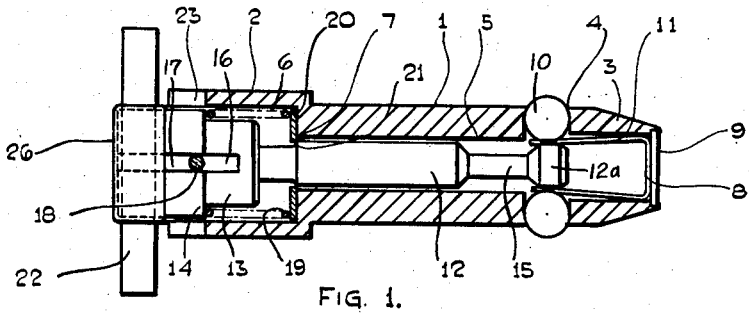
Fig. 1 is a view in partly sectional elevation showing the connecting device according to the invention in locked position, leaving a locking portion 12a of normal diameter at the end of the plunger.

As shown in Fig. 1 of the drawing the device comprises a tube 1 having a head or flange 2 of larger diameter and a conical or bevelled portion 3 at its opposite end. Spring 19 normally holds plunger 12 in a locking position shown in Figure 1 where locking portion 12a is located between the balls 10. Near its conical portion the tube 1 is formed with radial apertures 4 communicating with a central bore 5 of substantially uniform diameter which is enlarged at 6 within the head 2 thus forming an inner shoulder or step 7 at the junction.

A portion of the bore 5 extending from the radial apertures 4 to the bevelled end 3 of the tube 1 is slightly enlarged for accommodation of a U-shaped leaf spring 8, the base of which bears against an end plate or disc 9 secured to and closing the tube 1 at this end.

Two locking elements such as balls 10 are movably arranged in the radial apertures 4 which have a reduced diameter at the surface of the tube 1 thus preventing the balls 10 from escaping. The free ends of the arms 11 of the leaf spring 8 keep the balls 10 in protruded position but allow them to recede when external force is applied to them.

An axially movable plunger 12 is housed within the bore 5 and its head 13 which is integral with an operating member 14 lies within the head 2 of the tube 1. Near its opposite end the plunger 12 is formed with a portion of a narrow diameter 15. The head 13 of the plunger 12 and the operating member 14 are both formed with an axial slot 16 and 17 respectively, and a cross pin 18 located at the head portion of the tube 1 extends through the slots 16 and 17 thus limiting the stroke of the plunger 12 and preventing the latter from being pulled out of the tube 1.

A compression spring 19 is accommodated within the head 2 of the tube 1 bearing with its one end against a washer 20 resting partly on the shoulder 21 of the plunger 12 and on the step 7 of the tube 1, and with its other end against the operating member 14 and the cross pin 18. A tommy bar 22 is affixed to the operating member 14 in order to enable the operator to pull on the plunger 12, and a dust cap 26 is fitted to the operating member 14 and is slotted to clear the tommy bar ends. Furthermore the head 2 of the tube 1 is partly slotted or recessed at 23 in order to give a passage to the tommy bar 22 when the operator applies a push force on the operating member 14.

Figure 2:
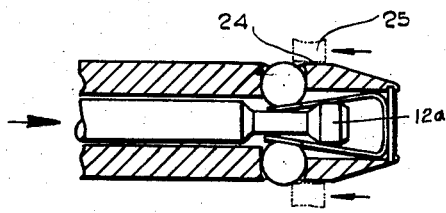
Fig. 2 is a fragmentary view partly in section showing the unlocking of the balls by applying a push force on the plunger.
Figure 3:
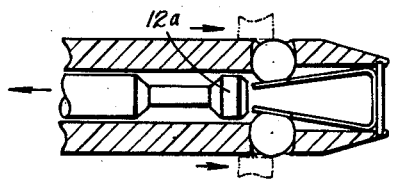
Fig. 3 is a fragmentary view partly in section similar to that of Fig. 2, showing the unlocking of the balls by applying a pull force on the plunger.
Figure 4:
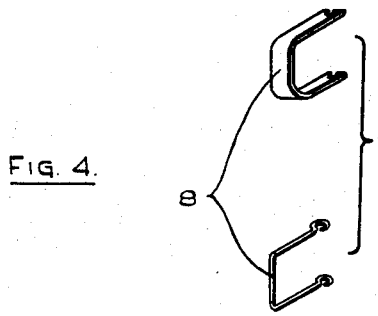
Fig. 4 is a perspective view of a leaf spring.

Fig. 1 shows the device in the locked position in which the compression spring 19 exerts equal pressure on the washer 20 and on the operating member 14. When a push force is applied on the operating member 14 the plunger 12 is displaced to the position shown in Fig. 2 in which the portion 15 is in register with the balls 10 thus permitting the fastener to be introduced into registering apertures 24 in members 25 to be fastened together; on removing the pressure on the operating member 14 the compression spring 19 returns the plunger 12 to its locked position as shown in Fig. 1 when the balls 10 are positively locked. By applying a pull on the operating member 14 the plunger 12 is displaced to the position shown in Fig. 3, in which the locking balls 10 are permitted to recede and the device to be withdrawn from the members 25. When the pull force is removed from the operating member 14 the compression spring 19 restores the plunger 12 to its locked position as shown in Fig. 1.

The U-shaped leaf spring 8 will hold the locking balls 10 permanently in protruded position thus preventing the device from falling out of the registering apertures in the event of a breakage of the compression spring 19 and the consequential displacement of the plunger 12, without, however, preventing its withdrawal when required.

It will be understood that a ring may be secured to the operating member 14 instead of the tommy bar 22.

I claim:

1. In a connecting device of the type comprising a tubular member having at least one locking member mounted for radial movement in a radially disposed passage formed in the wall of the tubular member near one end thereof, and a plunger being mounted for axial movement within said tubular member and having a locking portion normally positioned opposite the locking member and holding said locking member in locking position with a portion thereof projecting beyond the external surface of the tubular member, said plunger being movable from its normal or locking position to an unlocking position to permit movement of the locking member inwardly to a position at least flush with the external surface of the tubular member, the improvement which comprises resilient means supported within said tubular member independently of said plunger and acting on said locking member and urging said locking member outwardly into locking position, said resilient means being yieldable under pressure from said locking member to permit said locking member to move inwardly when said plunger is in unlocking position.

2. A connecting device according to claim 1 wherein said spring means comprises a U-shaped spring positioned within the bore of said tubular member with the arms thereof embracing an end portion of said plunger when said plunger is in locking position and one arm thereof acting upon said locking member to hold said member in locking position.

3. A connecting device according to claim 2 wherein said plunger is provided with a section of reduced diameter adjacent the locking portion thereof, said plunger being movable to a position where said portion of reduced diameter is opposite said locking member, and the said one arm of said U-shaped spring being movable into the annular recess formed about said portion of reduced diameter upon pressure being exerted upon said locking member to move it inwardly.

4. A connecting device comprising a tubular member having at least one locking member mounted for radial movement in a radially disposed passage formed in the wall of the tubular member near one end thereof, a plunger mounted for axial movement within said tubular member and having a locking portion normally positioned opposite said locking member and holding said locking member in locking position with a portion thereof projecting beyond the external surface of the tubular member, said plunger being movable from its normal or locking position to an unlocking position to permit movement of the locking member inwardly to a position at least flush with the external surface of the tubular member, the bore of said tubular member having an enlarged portion adjacent the radial passage containing said locking member, and spring means supported within said enlarged bore portion independently of said plunger and acting on said locking member and urging said locking member outwardly into locking position, said spring means being yieldable under pressure from said locking member to permit said member to move inwardly when said plunger is in unlocking position.

5. In a connecting device of the type comprising a tubular member having a head portion and a reduced shank portion formed integrally with the head portion, at least one locking ball element being mounted for radial movement in a radially disposed passage formed in the wall of the shank portion near one end thereof, and a plunger being mounted for axial movement within said tubular member and having a locking portion normally positioned opposite the ball element and holding said ball element in locking position with a portion thereof projecting beyond the external surface of the tubular member, said plunger being movable from its normal or locking position to an unlocking position to permit movement of the ball element inwardly to a position at least flush with the external surface of the shank portion, the improvement which comprises spring means supported within said tubular member independently of said plunger and urging said ball element outwardly into locking position, said spring means being yieldable under pressure from said ball element to permit said ball element to move inwardly when said plunger is in unlocking position.

References Cited in the file of this patent

UNITED STATES PATENTS

| | | |
|---|---|---|
| 2,675,724 | Beyer | Apr. 20, 1954 |
| 2,779,228 | Meepos et al. | Jan. 29, 1957 |
| 2,816,471 | Bachman | Dec. 17, 1957 |

UNITED STATES PATENT OFFICE
CERTIFICATE OF CORRECTION

Patent No. 2,983,978 May 16, 1961

Edward D. Wilgus

It is hereby certified that error appears in the above numbered patent requiring correction and that the said Letters Patent should read as corrected below.

Column 1, lines 58 and 59, strike out ", leaving a locking portion 12a of normal diameter at the end of the plunger"; lines 70 to 72, strike out "Spring 19 normally holds plunger 12 in a locking position shown in Figure 1 where locking portion 12a is located between the balls 10."; column 2, line 18, for "tnbe" read -- tube --; line 20, for "15." read -- 15, leaving a locking portion 12a of normal diameter at the end of the plunger. --; same column 2, line 32, after "pin 18." insert -- Spring 19 normally holds plunger 12 in a locking position shown in Figure 1 where locking portion 12a is located between the balls 10. --; column 3, line 19, for "spring", first occurrence, read -- resilient --.

Signed and sealed this 2nd day of January 1962.

(SEAL)
Attest:

ERNEST W. SWIDER
Attesting Officer

DAVID L. LADD
Commissioner of Patents